(12) United States Patent
Jeong et al.

(10) Patent No.: US 11,281,455 B2
(45) Date of Patent: Mar. 22, 2022

(54) APPARATUS FOR OVER THE AIR UPDATE FOR VEHICLE AND METHOD THEREFOR

(71) Applicants: HYUNDAI MOTOR COMPANY, Seoul (KR); KIA MOTORS CORPORATION, Seoul (KR)

(72) Inventors: Hyeok Sang Jeong, Suncheon-si (KR); Myeong Gyu Jeong, Seoul (KR); Dong Youl Lee, Seoul (KR); Jae Am Seo, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/898,121

(22) Filed: Jun. 10, 2020

(65) Prior Publication Data
US 2021/0081192 A1    Mar. 18, 2021

(30) Foreign Application Priority Data

Sep. 18, 2019  (KR) .......................... 10-2019-0114878

(51) Int. Cl.
| | |
|---|---|
| *G06F 8/658* | (2018.01) |
| *H04W 4/44* | (2018.01) |
| *G06F 8/65* | (2018.01) |
| *H04L 29/08* | (2006.01) |
| *H04L 67/12* | (2022.01) |
| *H04L 67/00* | (2022.01) |

(52) U.S. Cl.
CPC ............... *G06F 8/658* (2018.02); *G06F 8/66* (2013.01); *H04L 67/12* (2013.01); *H04L 67/34* (2013.01); *H04W 4/44* (2018.02)

(58) Field of Classification Search
CPC ... G06F 8/658; G06F 8/66; G06F 8/65; G06F 8/654; H04W 4/44; H04L 67/12; H04L 67/34; H04L 1/0002; H04B 1/3822
USPC .................................................. 717/168–178
See application file for complete search history.

(56) References Cited

U.S. PATENT DOCUMENTS

| | | | |
|---|---|---|---|
| 6,334,080 B1 * | 12/2001 | Iwai ....................... | B60W 50/00 701/1 |
| 10,353,694 B1 * | 7/2019 | Fields ................ | B60W 30/0956 |
| 10,564,954 B2 * | 2/2020 | Tillman .................. | B60L 58/12 |
| 2016/0197932 A1 * | 7/2016 | Hoffman ............. | H04L 63/1408 726/4 |
| 2018/0018159 A1 * | 1/2018 | Eller ..................... | H04W 12/10 |

(Continued)

OTHER PUBLICATIONS

Odat, Hesham A., and Subra Ganesan. "Firmware over the air for automotive, fotamotive." IEEE International Conference on Electro/Information Technology. IEEE, 2014.pp. 130-139 (Year: 2014).*

(Continued)

*Primary Examiner* — Satish Rampuria
(74) *Attorney, Agent, or Firm* — Morgan, Lewis & Bockius LLP

(57) ABSTRACT

An apparatus for over the air update (OTA) for a vehicle and a method therefor are provided. The apparatus includes a communication device to receive data for the OTA update of vehicle software from a sever, and a processor to control background transfer for the OTA update based on at least one of a network load update, a vehicle power state, a battery state, or an expected time for residual read-only memory (ROM) data transfer.

19 Claims, 9 Drawing Sheets

(56) References Cited

U.S. PATENT DOCUMENTS

2018/0268238 A1* 9/2018 Khan .................. G06F 16/583
2019/0258466 A1* 8/2019 Mitchell ................ H04L 67/34
2021/0291900 A1* 9/2021 Tagesson ........ B60W 30/18036

OTHER PUBLICATIONS

Teraoka, Hidetoshi, Fumiharu Nakahara, and Kenichi Kurosawa. "Incremental update method for resource-constrained in-vehicle ECUs." 2016 IEEE 5th Global Conference on Consumer Electronics. IEEE, 2016.pp. 1-2 (Year: 2016).*
La Manna, Michele, et al. "Performance Evaluation of Attribute-Based Encryption in Automotive Embedded Platform for Secure Software Over-The-Air Update." Sensors 21.2 (2021): pp. 1-14. (Year: 2021).*
Changalvala, Raghu, and Hafiz Malik. "LiDAR data integrity verification for autonomous vehicle." IEEE Access 7 (2019): pp. 138018-138031. (Year: 2019).*
Nilsson, Dennis K., Phu H. Phung, and Ulf E. Larson. "Vehicle ECU classification based on safety-security characteristics." IET Road Transport Information and Control-RTIC 2008 and ITS United Kingdom Members' Conference. IET, 2008.pp. 1-8 (Year: 2008).*
Howden, James, Leandros Maglaras, and Mohamed Amine Ferrag. "The security aspects of automotive over-the-air updates." International Journal of Cyber Warfare and Terrorism (IJCWT) 10.2 (2020): pp. 64-81. (Year: 2020).*
European Search Report for European Application No. EP 20180720 dated Dec. 4, 2020 (8 pgs).

* cited by examiner

APPARATUS FOR OVER THE AIR UPDATE FOR VEHICLE AND METHOD THEREFOR

CROSS-REFERENCE TO RELATED APPLICATION

The present application claims priority to and the benefit of Korean Patent Application No. 10-2019-0114878, filed on Sep. 18, 2019, which is incorporated herein by reference in its entirety.

TECHNICAL FIELD

The present disclosure relates to an apparatus for Over the air (OTA) update for a vehicle and a method therefor, and more particularly to a background transfer technology for the OTA update for a vehicle.

BACKGROUND

The statements in this section merely provide background information related to the present disclosure and may not constitute prior art.

As Intelligent Transportation System (ITS) is developed and the proportion of vehicles allowing wireless communication (for example, WiFi, 3G, LTE, or the like) increases, the communication with an external object, such as another vehicle or an infrastructure, in the vehicle has been extensively spread.

In addition, the number of electronic control units (ECUs) in the vehicle has been increased as well. As the structures and the functions of such electronic controllers become more and more complicated, software modules inside the electronic controllers need to be updated for reasons of bug fixes, performance improvements, and security as well.

Accordingly, the vehicle updates vehicle information based on wireless communication during traveling or in Ignition Off, and the security may be required when such an update is performed.

In particular, a controller (safety-related controller) with ASIL grade or a controller requiring the functional operation is updated through memory dualization for continuous operation of the function. In this case, a differential type update is performed to reduce the size of the ROM data required for the update.

The memory dualization scheme and the differential scheme require data transmission from a management controller to an execution controller before the update is performed. This is called background transfer. The background transfer is performed during the travelling or in Ignition Off, which occupies a communication network and interrupts the real-time property of another vehicle function.

SUMMARY

An aspect of the present disclosure provides an apparatus for OTA update for a vehicle, capable of executing background transfer to update vehicle software while reducing the influence on a communication network load, and a method thereof.

According to an aspect of the present disclosure, an apparatus for over the air update (OTA) for vehicle may include a communication device to receive data for the OTA update of vehicle software from a sever, and a processor to control background transfer for the OTA update based on at least one of a network load, a vehicle power state, a battery state, or an expected time for residual ROM data transfer.

In some forms of the present disclosure, the processor may include a management controller to set a transmission rate based on the network load, and control the background transfer based on the set transmission rate and a vehicle state, and an execution controller to receive data from the management controller to perform the OTA update.

In some forms of the present disclosure, the processor may perform the OTA update in a memory dualization scheme and/or a differential scheme.

In some forms of the present disclosure, the processor may determine whether a vehicle mode for the OTA update is a download mode or an update mode, and determine whether the vehicle is in a driving state when the vehicle mode is the download mode.

In some forms of the present disclosure, the processor may determine whether the vehicle network load is greater than a threshold value, when the vehicle is in an Ignition Off (IG OFF) state.

In some forms of the present disclosure, the processor may set a time interval between consecutive frames to be longer and set a unit transfer block size to be smaller, when the network load of the vehicle is greater than the threshold value. When the network load of the vehicle is equal to or less than the threshold value, the processor may set the time interval between the consecutive frames to be shorter, and set the unit transfer block size to be greater.

In some forms of the present disclosure, the processor may perform the background transfer based on the vehicle network load, and may determine whether the vehicle is travelling when the background transfer is completed.

In some forms of the present disclosure, the processor may complete the background transfer when the vehicle state is an IG OFF state; and receive approval from a user for the OTA update to perform the OTA update, when the vehicle state transits to the IG OFF from an ignition on (IG ON).

In some forms of the present disclosure, the apparatus may further include a display to display a screen for receiving the approval from the user.

In some forms of the present disclosure, the apparatus may further include an alarm device configured to notify the user of a request for the approval for the OTA update.

In some forms of the present disclosure, the processor may calculate the expected time for the residual ROM data transfer, and determine whether a present battery state allows the background transfer for the expected time for the residual ROM data, when the vehicle is in the IG ON.

In some forms of the present disclosure, the processor may determine the network load, when the background transfer is possible.

In some forms of the present disclosure, the processor may continuously perform the background transfer even if the vehicle power state transits.

According to another aspect of the present disclosure, an apparatus for OTA update for a vehicle may include a management controller to download data for the OTA update from a server, set a transmission rate based on a network load for the OTA update, and control background transfer based on the set transmission rate and a vehicle state, and an execution controller to receive the data from the management controller to perform the OTA update.

According to another aspect of the present disclosure, a method for OTA update for a vehicle may include determining at least one of a network load, a vehicle power state, a battery state, or an expected time for residual ROM data transfer and controlling background transfer for the OTA update, based on the at least one of the network load, the vehicle power state, the battery state, or the expected time for the residual ROM data transfer.

In some forms of the present disclosure, the determining of the at least one of the network load, the vehicle power state, the battery state, or the expected time for the residual ROM data transfer may include determining whether a vehicle mode for the OTA update is a download mode or an update mode, determining whether the vehicle is in a driving state when the vehicle mode is the download mode, and determining the network load, when the vehicle is in an IG OFF state.

In some forms of the present disclosure, the controlling of the background transfer for the OTA update may include setting a time interval between consecutive frames to be longer and set a unit transfer block size to be smaller, when the network load of the vehicle is greater than a threshold value, and setting the time interval between the consecutive frames to be shorter, and set the unit transfer block size to be greater, when the network load of the vehicle is equal to or less than the threshold value.

In some forms of the present disclosure, the controlling of the background transfer for the OTA update may further include performing the background transfer based on the vehicle network load, and determining a vehicle state when the background transfer is completed.

In some forms of the present disclosure, the controlling of the background transfer for the OTA update may further include completing the background transfer when the vehicle state is an IG OFF state, and receiving approval from a user for the OTA update to perform the OTA update, when the vehicle state transits to the IG OFF from an ignition on (IG ON).

In some forms of the present disclosure, the controlling of the background transfer for the OTA update may further include calculating the expected time for the residual ROM data transfer, and determining whether a present battery state allows the background transfer for the expected time for the residual ROM data, when the vehicle is in an IG ON.

In some forms of the present disclosure, the controlling of the background transfer for the OTA update may further include determining the network load, when the background transfer is possible.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
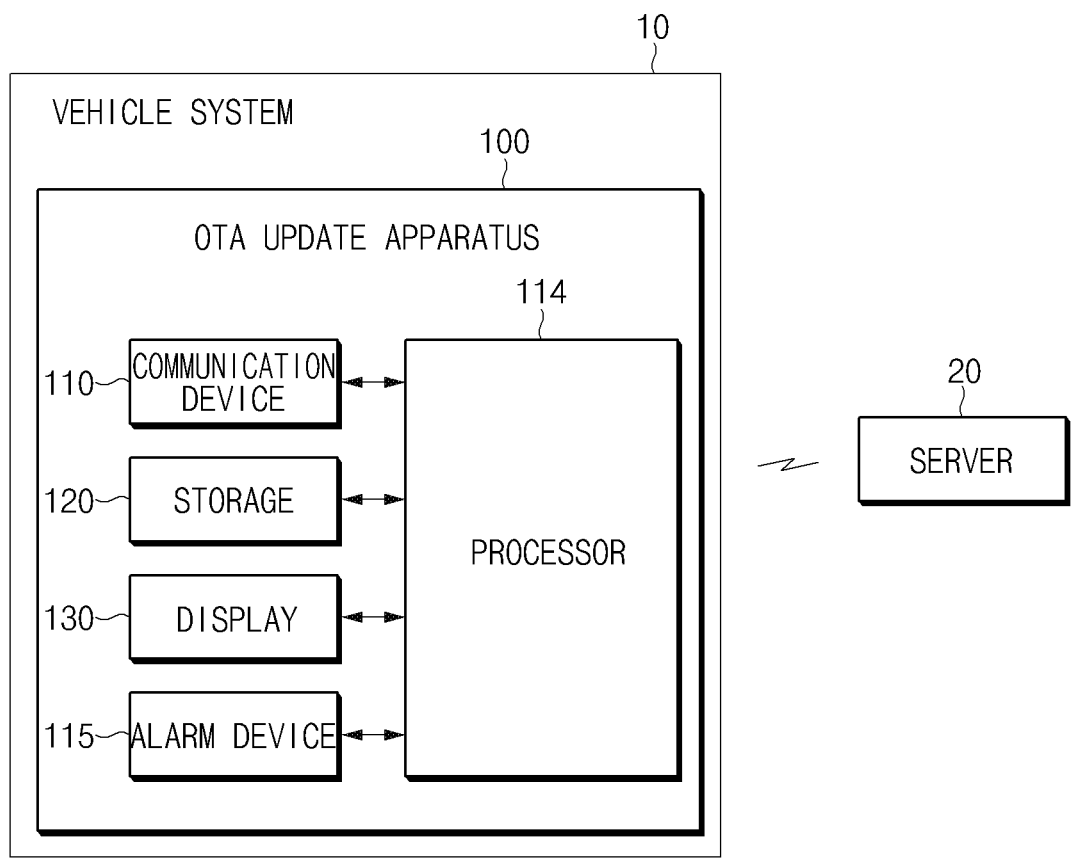
FIG. 1 is a block diagram illustrating the configuration of a vehicle system including an apparatus for OTA update for a vehicle, in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing some forms of the present disclosure, a detailed description of well-known features or functions will be ruled out in order not to unnecessarily obscure the gist of the present disclosure.

In describing some forms of the present disclosure, terms such as first, second, "A", "B", (a), (b), and the like may be used. These terms are merely intended to distinguish one component from another component, and the terms do not limit the nature, sequence or order of the constituent components. In addition, unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure discloses a technology of executing stable background transfer to perform memory dualization and differential OTA software update, based on a general message load rate of in-vehicle networking (IVN), a vehicle power state, a battery state, or an expected time for residual ROM data transfer.

Hereinafter, some forms of the present disclosure will be described in detail with reference to FIGS. 1 to 9.

FIG. 1 is a block diagram illustrating the configuration of a vehicle system 10 including an apparatus (hereinafter, referred to as a "vehicle OTA update apparatus") for OTA update for a vehicle, in some forms of the present disclosure.

Referring to FIG. 1, in some forms of the present disclosure, the vehicle OTA update apparatus 100 may perform background transfer of data for the OTA update of software for a vehicle from a server 20 outside the vehicle.

The vehicle OTA update apparatus 100 may control background transfer for the OTA update based on at least one of a network load, a vehicle power state, a battery state, or an expected time for residual ROM data transfer.

The vehicle OTA update apparatus 100 may include a communication device 110, a storage 120, a display 130, a processor 114, and an alarm device 115.

The communication device 110 is a hardware device implemented with various electronic circuits to transmit and receive a signal through wireless or wired connection. According to the present disclosure, the communication device 110 may make in-vehicle communication through controller area network (CAN) communication or local interconnect network (LIN) communication, Ethernet communication and may include various communication units, such as a mobile communication unit to make communication with the server 20 outside the vehicle, a broadcast receiving unit including a digital multimedia broadcasting (DMB) module or a Digital Video Broadcasting-Handheld (DVB-H) module, a short-range communication unit including a ZigBee module, which is a Bluetooth module, or an NFC module, or a WiFi communication unit.

The storage 120 may store data, which is downloaded for the OTA update for the vehicle, received from the sever 20 through the communication device 110. In addition, the storage 120 may store at least one of a network load, a vehicle power state, a battery state, or an expected time for residual ROM data transfer. The storage 120 may include at least one storage medium of a memory in a flash memory type, a hard disk type, a micro type, the type of a card (e.g., a Security Digital (SD) card or an eXtreme digital card), a Random Access Memory (RAM), a Static RAM (SRAM), a Read Only Memory (ROM), a Programmable ROM (PROM), an Electrically Erasable and Programmable ROM (EEPROM), a magnetic RAM (MRAM), a magnetic disk-type memory, or an optical disk-type memory.

The display 130 may be controlled by the processor 114 to display a screen to obtain the approval for user authentication to the OTA update for the vehicle. The display 130 may be implemented with a head up display (HUD), a cluster, or an audio video navigation (AVN). In addition, the display 130 may include at least one of a liquid crystal display (LCD), a thin film transistor-liquid crystal display (TFT LCD), a light emitting diode (LED), an organic light-emitting diode (OLED), an active matrix OLED (AMOLED), a flexible display, a bended display, or a third dimension (3D) display. Among them, some displays may be implemented with transparent displays configured in a transparent type or a translucence type such that the displays are viewed from the outside. In addition, the display 130 is implemented with a touchscreen including a touch panel to be used as an input device in addition to an output device.

The processor 114 may be electrically connected with the communication device 110, the storage 120, the display 130, and the alarm device 115, may electrically control each component, and may be an electric circuit that executes software commands. Accordingly, the processor 114 may perform various data processing and calculation, to be described below.

The processor 114 may control the background transfer for the OTA update based on at least one of a network load, a vehicle power state, a battery state, or an expected time for residual ROM data transfer. The processor 114 may perform OTA update in a memory dualization scheme and/or a differential scheme. The memory dualization scheme performs reprogramming by installing ROM data in an inactive area and changing the inactive area to an active area during controller operation through memory dualization. The memory difference method is to perform reprogramming by comparing the previous ROM data with the current ROM data, extracting the changed data as the difference data, and transmitting the difference data to the controller and then modifying the previous ROM data based on the difference data.

The processor 114 may determine whether a vehicle mode for OTA update is a download mode or an update mode, and may determine whether the vehicle is travelling, when the vehicle mode is the download mode.

The processor 114 may determine whether the network load of the vehicle is greater than a threshold value, when the vehicle is an Ignition Off state.

When the network load of the vehicle is greater than the threshold value, the processor 114 may set a time interval between consecutive frames to be longer and a unit transfer block size to be smaller. When the network load of the vehicle is equal to or less than the threshold value, the processor 114 may set the time interval between the consecutive frames to be shorter, and set the unit transfer block size to be greater.

The processor 114 may perform the background transfer based on the network load of the vehicle and may determine the vehicle state when the background transfer is completed.

When the vehicle state is an Ignition Off state, the processor 114 may complete the background transfer. The processor 114 may receive the approval for the OTA update from a user when the vehicle state is an ignition on state, and transits to the Ignition Off state.

When the vehicle is in the ignition on state, the processor 114 may calculate the expected time for the residual ROM data transfer and may determine whether a present battery state allows the background transfer for the expected time for the residual ROM data transfer. When the present battery state allows the background transfer for the expected time for the residual ROM data transfer, the processor 114 may determine a network load.

The processor 114 may continuously perform the background transfer even if the power state of the vehicle transits.

The alarm device 115 may output a notification for approval to a user, when the screen for receiving the approval from the user is displayed on the display 130.

As described above, according to the present disclosure, the communication network load is considered when the background transfer is performed before the OTA update for the vehicle, thereby minimizing the influence on the communication network load while performing the background transfer. Accordingly, the update time may be reduced and the consecutive background transfer may be ensured. In addition, in the Ignition Off state of the vehicle, it is determined whether the background transfer is possible, based on the battery state and the expected time for the residual ROM data transfer and then the background transfer is performed when the background transfer is possible, thereby preventing the starting performance from being degraded due to the background transfer.

Figure 2:
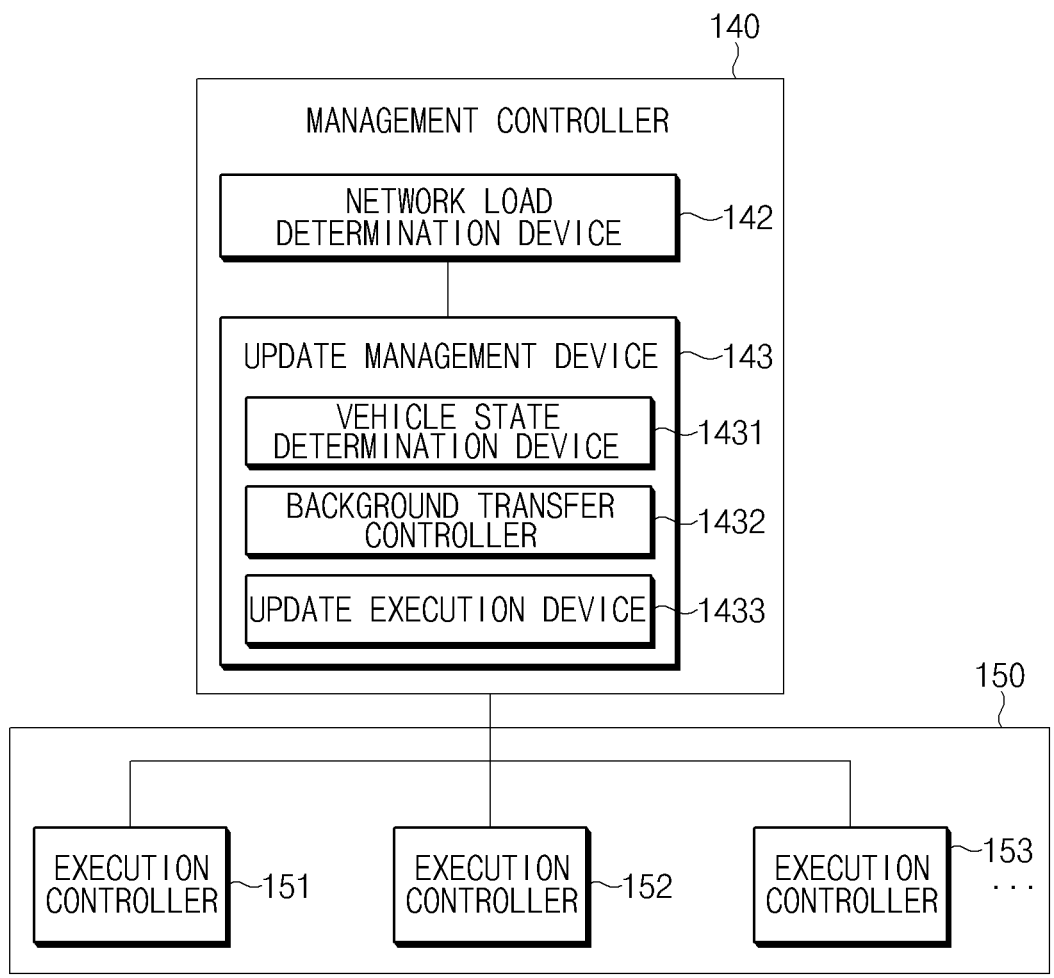
FIG. 2 is a view illustrating the detailed configuration of the apparatus for the OTA update for the vehicle, in one form of the present disclosure.

FIG. 2 is a view illustrating the detailed configuration of the apparatus for the OTA update for the vehicle, in some forms of the present disclosure.

Referring to FIG. 2, the vehicle OTA update apparatus 100 includes a management controller 140 and an update management device 143.

The management controller 140, which is a controller in charge of the OTA update, downloads ROM data from a server and transfers the ROM data to an execution controller such that reprogramming is executed.

The management controller 140 includes a network load determination device 142, and an update management device 143.

The network load determination device 142 senses the number of messages per unit time to determine the network load rate and transfers the network load rate to a background transmission controller of the update management device.

The update management device 143, which is in charge of updating, and controls main OTA functional operations, such as update and background transfer.

To this end, the update management device 143 includes a vehicle state determination device 1431, a background transfer controller 1432, and an update execution device 1433.

The vehicle state determination device 1431 determines a condition to perform the background transfer and transmits the determination result to the background transfer controller 1432. The condition to perform the background transfer may include a wireless download completion and a vehicle power state.

The background transfer controller 1432 performs the background transfer based on a network load rate received from the network load determination device 142 and a signal received from the vehicle state determination device 1431.

The update execution device 1433 obtains user authentication in the Ignition Off state after the background transfer is completed and performs the update (a swap command in the case of memory dualization).

Figure 3:
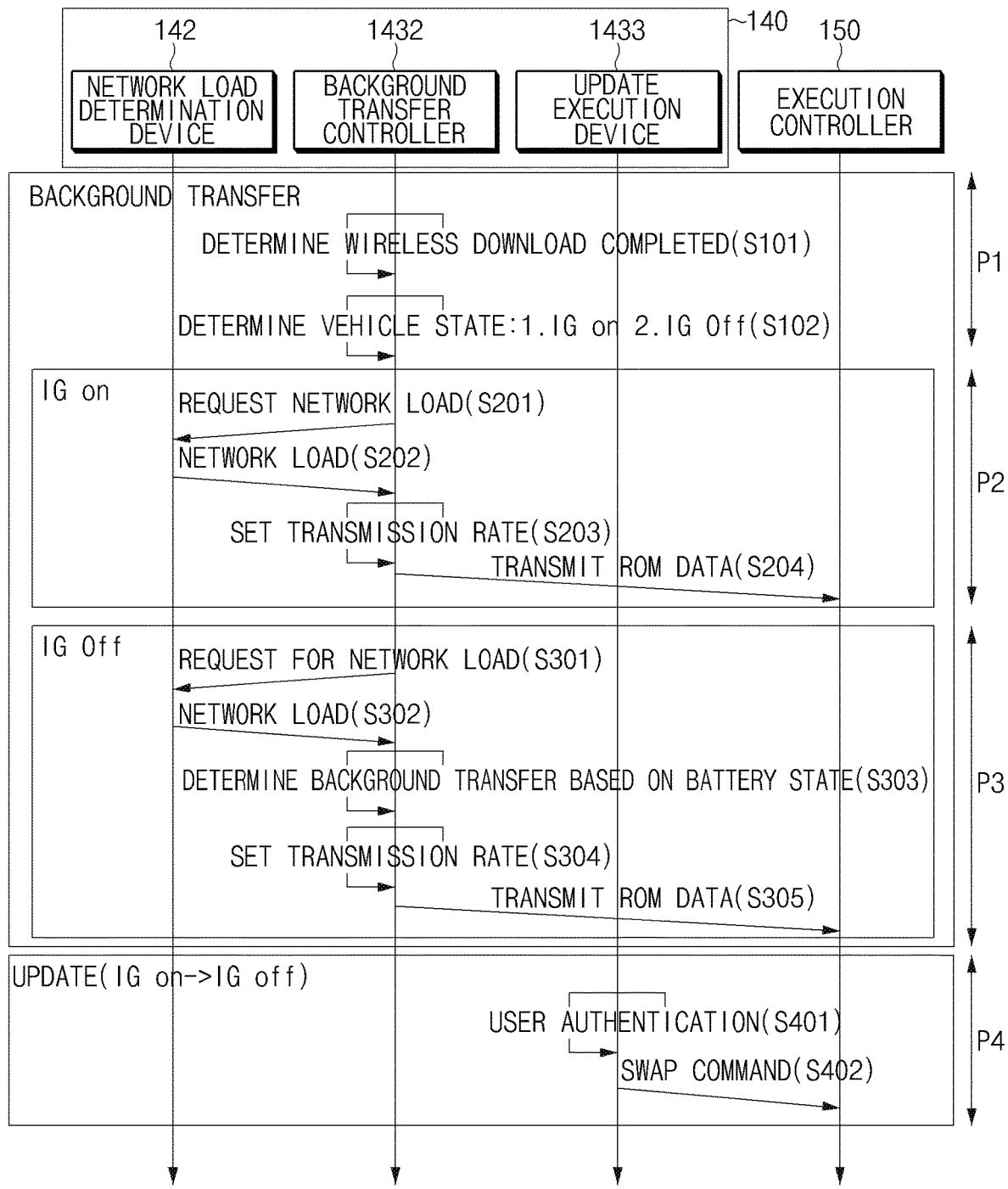
FIG. 3 is a flowchart illustrating a method for performing background transfer and update by the apparatus for the OTA update for the vehicle, in one form of the present disclosure.

FIG. 3 is a flowchart illustrating a method for performing background transfer and update by the apparatus for the OTA update for the vehicle, in some forms of the present disclosure.

The background transfer controller 1432 of the management controller 140 executes the background transfer after the wireless download completion. The background transfer may operate differently depending on the state of the vehicle (e.g., driving conditions, power conditions). The background transfer controller 1432 determines the vehicle state (procedure P1).

When the state of the vehicle is the ignition on (driving) state in operation S102, the management controller 140 performs process P2 process.

The background transfer controller 1432 requests the network load determination device 142 to determine the network load (S201), and the network load determination device 142 determines the network load by sensing the number of general messages on the network and transmits the network load determination result to the background transfer controller 1432 (S202).

The background transfer controller 1432 sets the transmission rate of the ROM data (romdata) using the network load determination result (S203), and transmits the ROM data to the execution controller 150 according to the set transmission rate (S204).

Figure 4:
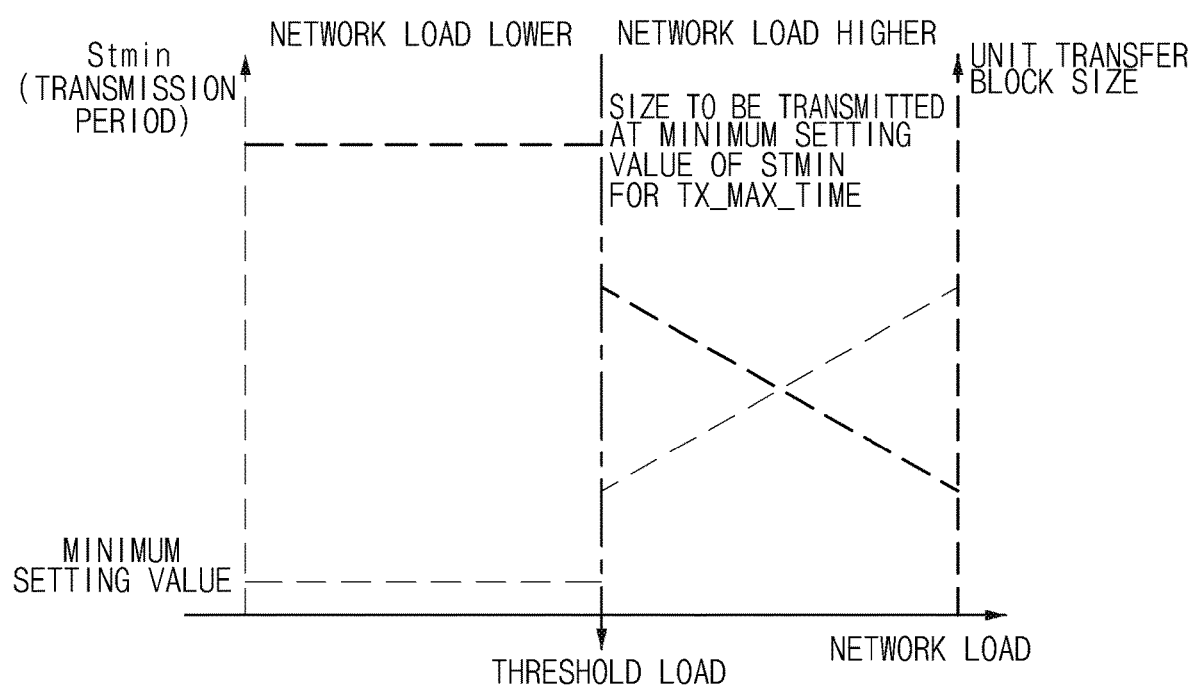
FIG. 4 is a graph illustrating a unit transfer block size based on a network load of the apparatus for the OTA update for the vehicle, in one form of the present disclosure.

In this case, the transmission rate of the ROM data may be determined based on a transmission period (STmin) and a unit transfer block size. FIG. 4 is a graph illustrating a unit transfer block size based on a network load of the apparatus for the OTA update for the vehicle, in some forms of the present disclosure.

In this case, the transmission period (STmin) refers to the time interval between consecutive frames.

The unit transfer block size refers to a memory size for the transmission for diagnosis service.

Hereinafter, a CAN network will be described by way of example with reference to FIG. 4. The background transfer controller 1432 sets the transmission period (STmin) to be longer, and sets the unit transfer block size to be smaller when the network load is heavy. To the contrast, the background transfer controller 1432 sets the transmission period (STmin) to be shorter and sets the unit transfer block size to be greater, when the network load is light. In addition, the background transfer controller 1432 limits a unit transfer time (TX_MAX_TIME).

Thereafter, the background transfer controller 1432 performs unit transmission at the set transmission rate and does not change the transmission rate during the unit transmission.

In operation S102, when the state of the vehicle is the Ignition Off state (during parking), the management controller 140 performs process P3. In other words, when the background transfer is not completed during the driving, the management controller 140 seamlessly performs the background transfer during Ignition Off (IG OFF); parking, calculates an expected time for residual background transfer for each controller, based on the setting value, and determines whether the background transfer is possible based on the battery state and the expected time. In addition, the background transfer controller may determine whether the background transfer is possible, based on the battery state, and may seamlessly the background transfer without the influence by the change in a power condition (e.g., IG ON/OFF).

The background transfer controller 1432 requests the network load determination device 140 to determine the network load (S301), the network load determination device 140 determines the network load by sensing the number of the general messages on the network, and transmits the determination result of the network load to the background transfer controller 1432 (S302).

Accordingly, the background transfer controller 1432 determines whether the background transfer is possible, based on the battery state and the expected time for the background transfer (S303), sets the transmission rate of ROM data using the determination result of the network load (S304), and transmits the ROM data to the execution controller 150 at the set transmission rate (S305). In other words, the background transfer controller 1432 determines whether the background transfer is possible in the present battery state for the expected time for the residual background transfer. When the background transfer is possible in the present battery state for the expected time for the residual background transfer, the background transfer controller 1432 continues the background transfer.

In this case, the background transfer controller 1432 may subsequently transmit the unit transmission started in the ignition on situation. When the IG On state is changed to the IG OFF state, the background transfer may be subsequently performed based on the network load in the procedure P2.

After the background transfer is completed through procedure P2 or procedure P3, when the state of the vehicle is changed from the IG On state (during driving) to the IG OFF state (during parking), the update execution device 1433 transmits a SWAP command (update command) to the execution controller 150 (S402) through the user authentication (S401).

Figure 5:
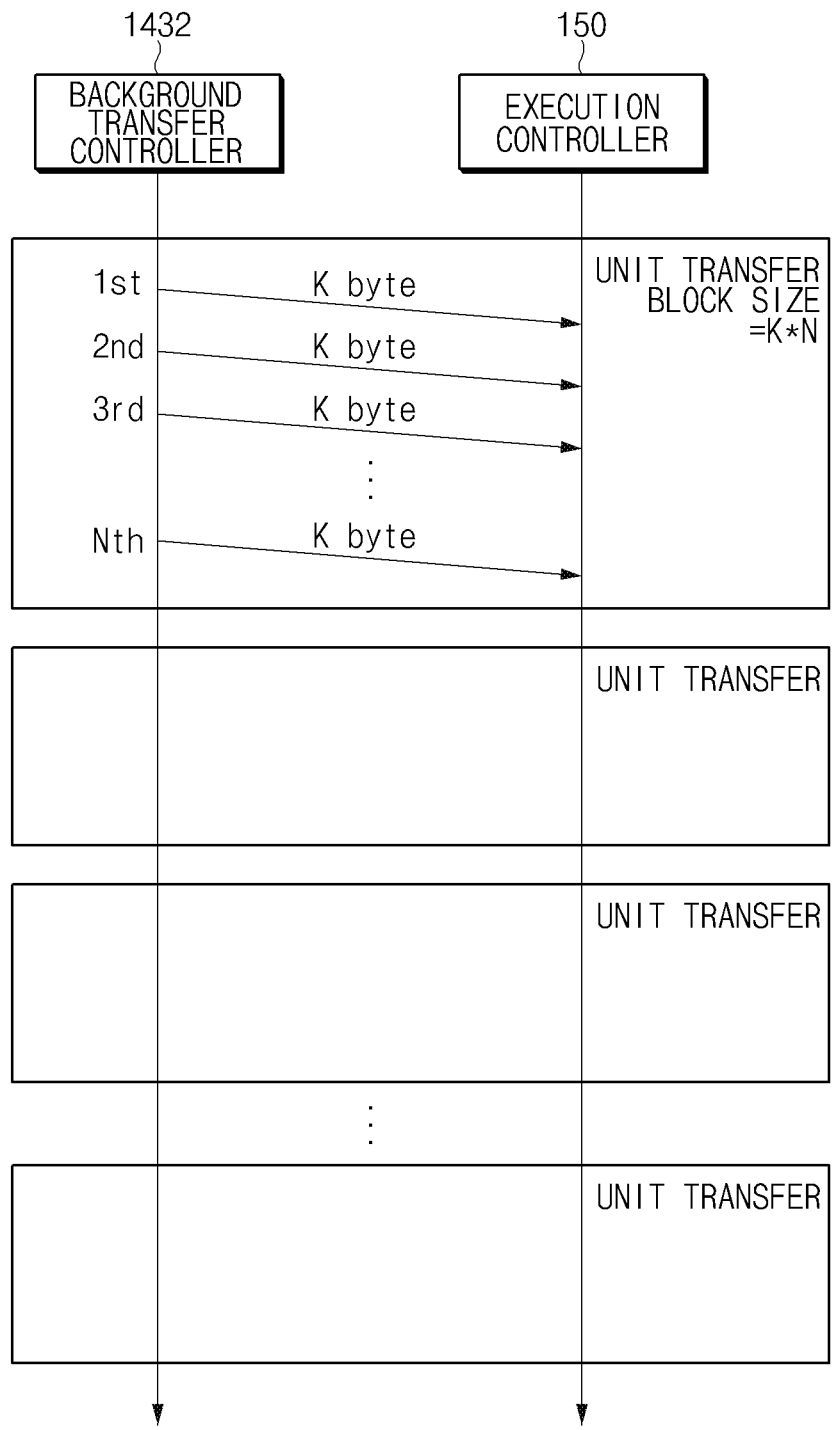
FIG. 5 is a flowchart illustrating ROM data background transfer, in one form of the present disclosure.

FIG. 5 is a flowchart illustrating ROM data background transfer, in some forms of the present disclosure.

Referring to FIG. 5, a unit transfer block size transmitted from the background transfer controller 1432 to the execution controller 150 is KBYTE, and N unit transmission blocks are provided and transmitted. Accordingly, the unit transfer block size of the ROM data transmitted from the background transfer controller 1432 to the execution controller 150 becomes K*N.

Figure 6:
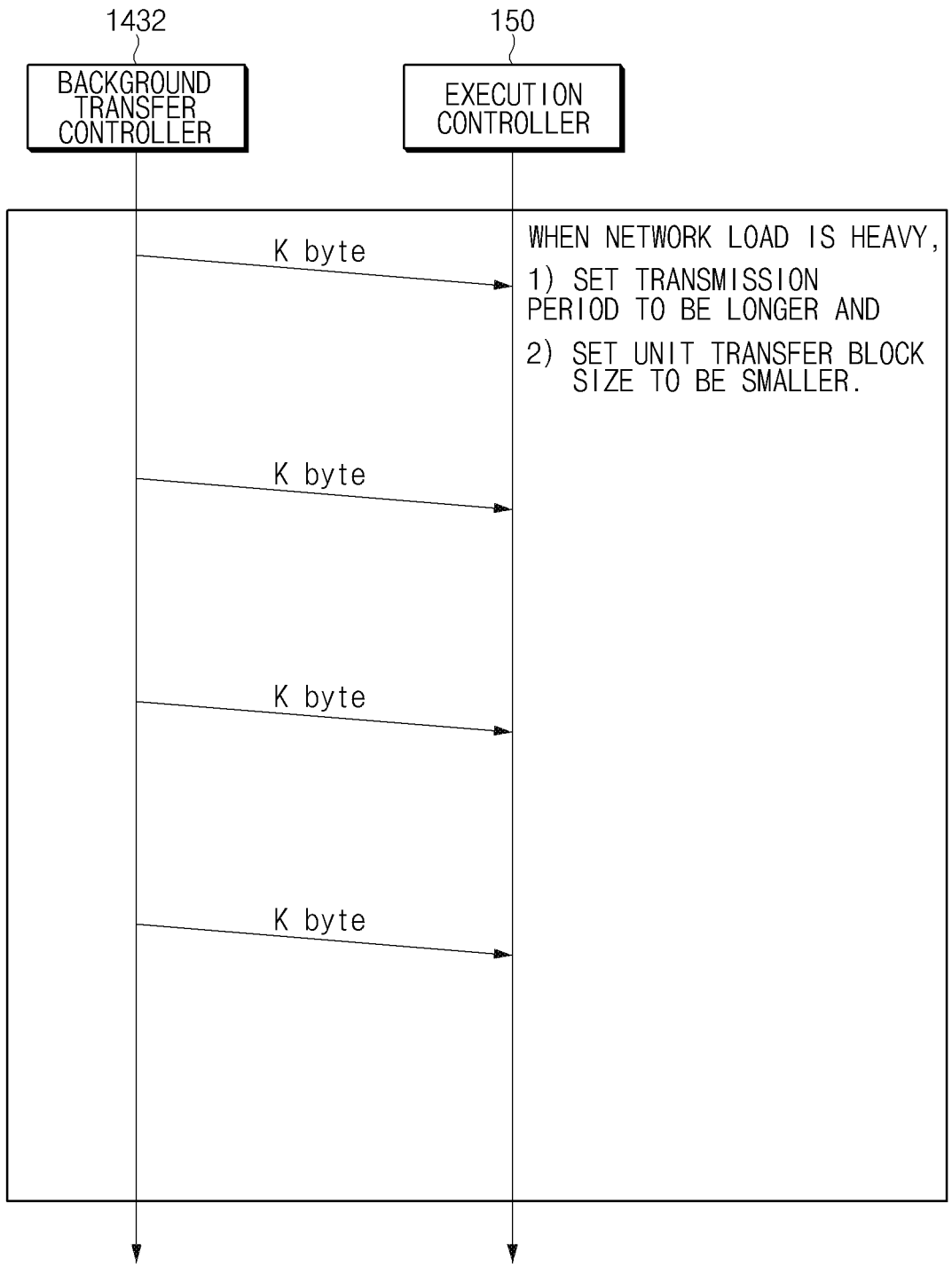
FIG. 6 is a flowchart illustrating unit transfer when the network load is heavy, in one form of the present disclosure.

FIG. 6 is a flowchart illustrating unit transfer when the network load is heavy, in some forms of the present disclosure.

Referring to FIG. 6, when the network load is heavy, the period of the unit transfer transmitted from the background transfer controller 1432 to the execution controller 150 is set to be longer, and the unit transfer block size is set to be smaller, thereby minimizing the network load.

Figure 7:
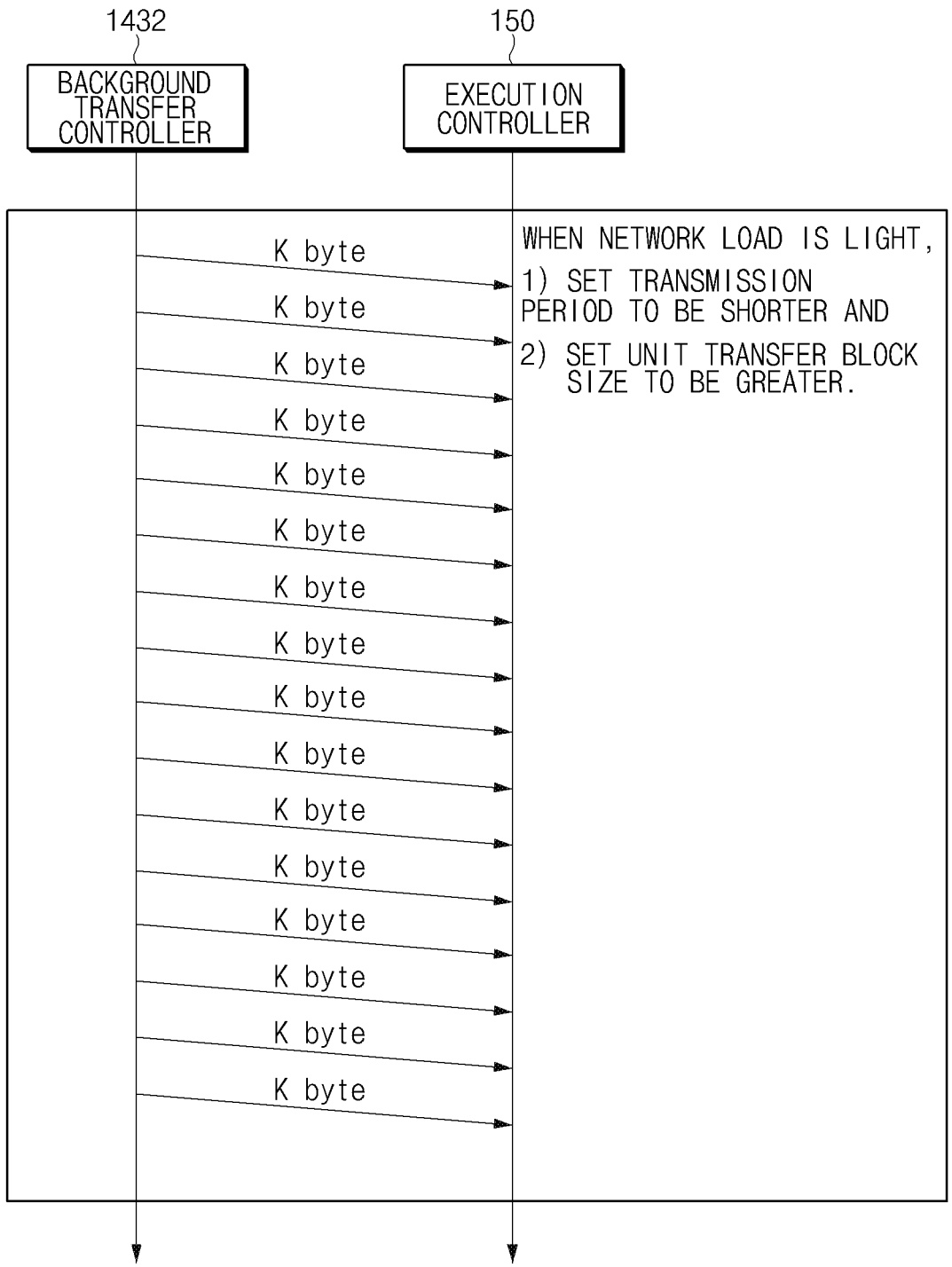
FIG. 7 is a flowchart illustrating unit transfer when the network load is light, in one form of the present disclosure.

FIG. 7 is a flowchart illustrating unit transfer when the network load is light, in some forms of the present disclosure. Referring to FIG. 7, when the network load is light, the background transfer for a larger capacity ROM data may be performed by shortening the period of the unit transfer transmitted from the background transfer controller 1432 to the execution controller 150 and increasing the unit transfer block size.

Figure 8:
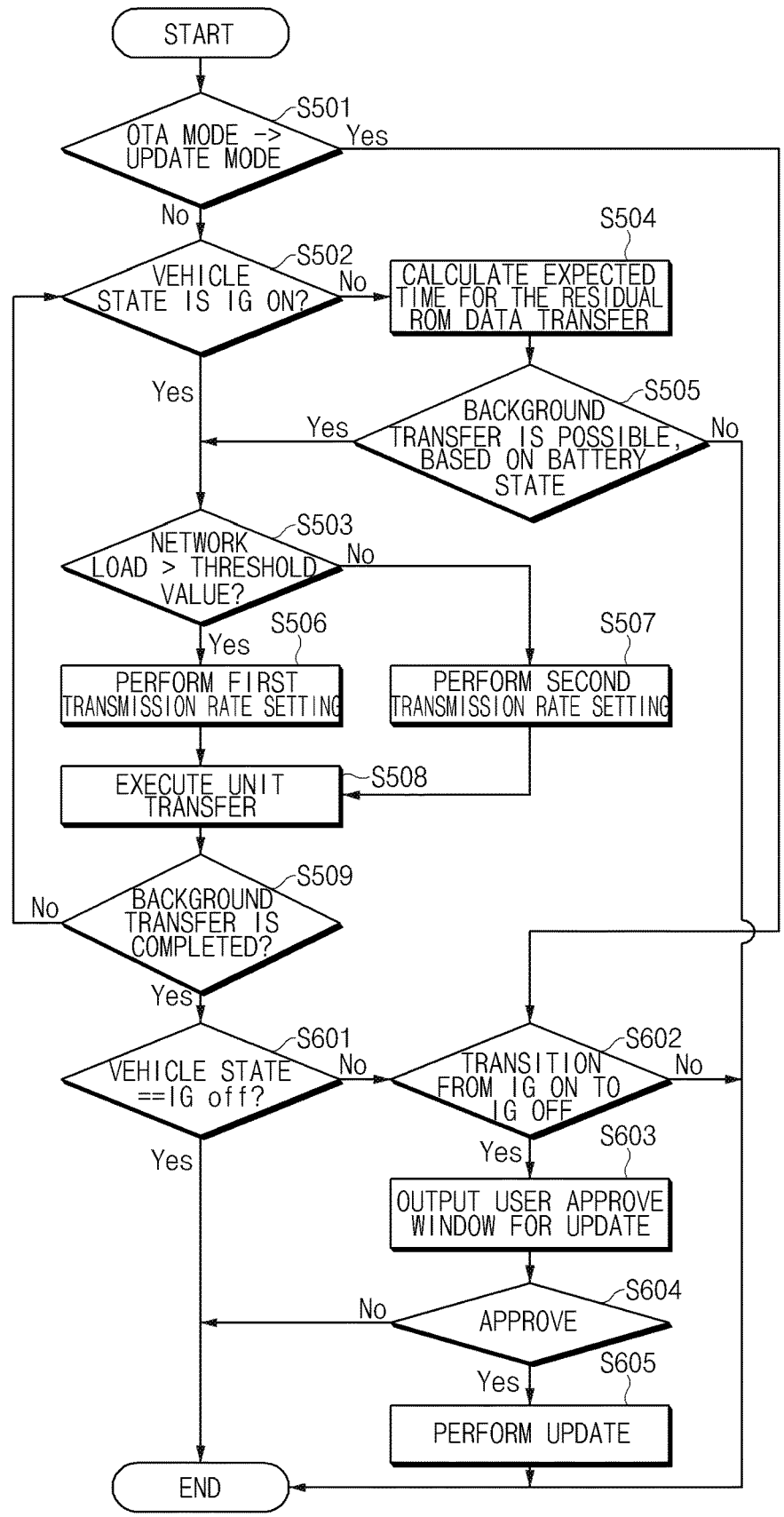
FIG. 8 is a flowchart illustrating a method for the OTA update for the vehicle, in one form of the present disclosure.

Hereinafter, a method for the OTA update for the vehicle will be described with reference to FIG. 8 in detail in some forms of the present disclosure. FIG. 8 is a flowchart illustrating the method for the OTA update for the vehicle in some forms of the present disclosure.

Hereinafter, it is assumed that the vehicle OTA update apparatus 100 of FIG. 1 performs the process of FIG. 8. In addition, in the following description made with reference to FIG. 8, it may be understood that the operation described as being performed by the vehicle OTA update apparatus 100 is controlled by the processor 114 of the vehicle OTA update apparatus 100.

Referring to FIG. 8, the vehicle OTA update apparatus 100 determines whether a vehicle OTA mode is the update mode (S501). In other words, when the background transfer is completed, the transition of the OTA mode is made from the download mode (background transfer mode) to the update mode.

When the OTA mode is not the update mode, since the background transfer is not completed, the vehicle OTA update apparatus 100 determines whether the vehicle state is the IG ON state or the IG OFF (S502).

When the vehicle state is the IG OFF state, the expected time for the residual ROM data transfer is calculated (S504), and it is determined whether the background transfer is possible, based on the battery state (S505).

When the battery state allows the background transfer, the vehicle OTA update apparatus 100 determines whether a preset network load is greater than the threshold value to continue the background transfer (S503).

The vehicle OTA update apparatus 100 performs first transmission rate setting when the present network load is greater than the threshold value (S506), and performs second transmission rate setting when the present network load is equal to or less than the threshold value (S507). In this case, the first transmission rate setting is to set the transmission period (STmin) to be longer and set the unit transfer block size to be smaller, and the second transmission rate setting is to set the transmission period (STMIN) to be shorter and set the unit transfer block size to be greater. In this case, the unit transfer time (TX_MAX_TIME) may be limited.

Subsequently, the vehicle OTA update apparatus 100 executes unit transfer from the management controller 140 to the execution controller 150 (S508), and determines whether the background transfer is completed (S509).

When the background transfer is not completed, the vehicle OTA update apparatus 100 repeats operation S502 to operation S509.

To the contrast, when the background transfer is completed, the vehicle OTA update apparatus 100 determines whether the vehicle state is the IG OFF state (S601). When the vehicle state is the IG OFF state, the background transfer is terminated.

Meanwhile, the vehicle OTA update apparatus 100 may determine continuously whether the transition from the IG ON state to the IG OFF state is made (S602) when the vehicle state is not currently the IG OFF, and outputs a user approve window for the update when the transition to the IG OFF is made (S603).

Accordingly, the vehicle OTA update apparatus 100 determines whether the user approves the update of the vehicle software (S604), and executes the update when the approval of the vehicle is completed (S605).

As described above, according to the present disclosure, when performing memory dualization and differential OTA software update, the influence on the communication network load is minimized while performing the background transfer.

In other words, according to the present disclosure, the network load is determined to stably execute the background transfer to variably set the transmission rate depending on the network load. Accordingly, the update time of the controller for memory dualization may be reduced approximately to "0" within the scope that does not infringe the real-time property of another controller, and the function continuity of a safety-related controller may be ensured.

In addition, according to the present disclosure, the background transfer is performed by determining whether the background transfer is possible, based on the battery state and the expected time for the residual ROM data in the IG OFF situation, thereby preventing vehicle starting performance from being degraded due to the background transfer.

Figure 9:
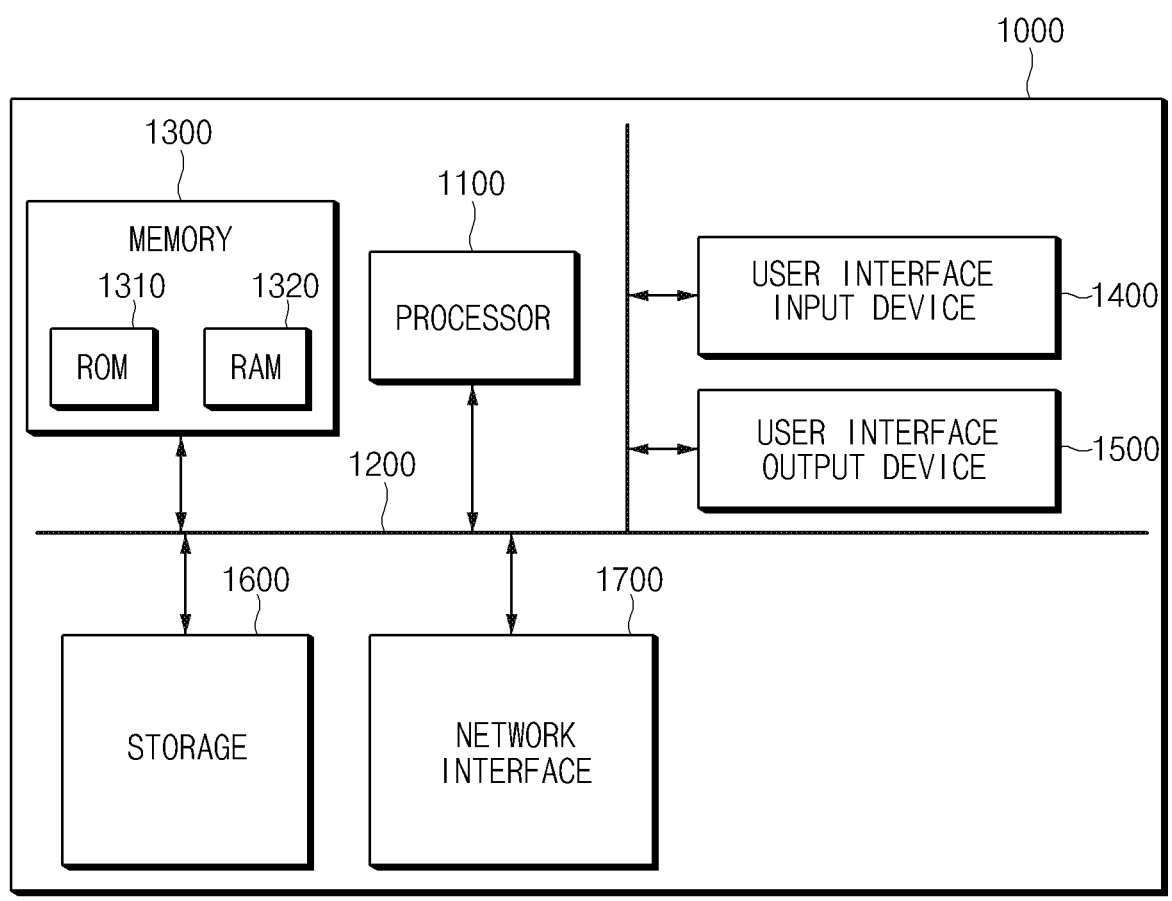
FIG. 9 is a computing system, in one form of the present disclosure.

FIG. 9 illustrates a computing system, in some forms of the present disclosure.

Referring to FIG. 9, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device for processing instructions stored in the memory 1300 and/or the storage 1600. The memory 1300 and the storage 1600 may include various types of volatile or non-volatile storage media. For example, the memory 1300 may include a read only memory (ROM) and a random access memory (RAM).

Thus, the operations of the methods or algorithms described in some forms of the present disclosure may be directly implemented with a hardware module, a software module, or the combinations thereof, executed by the processor 1100. The software module may reside on a storage medium (i.e., the memory 1300 and/or the storage 1600), such as a RAM, a flash memory, a ROM, an erasable and programmable ROM (EPROM), an electrically EPROM (EEPROM), a register, a hard disc, a removable disc, or a compact disc-ROM (CD-ROM).

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside in a driver terminal. Alternatively, the processor and the storage medium may reside as separate components of the driver terminal.

Hereinabove, although the present disclosure has been described in some forms of the present disclosure and the accompanying drawings, the present disclosure is not limited thereto, but may be variously modified and altered by those skilled in the art to which the present disclosure pertains without departing from the spirit and scope of the present disclosure claimed in the following claims.

Therefore, some forms of the present disclosure are provided to explain the spirit and scope of the present disclosure, but not to limit them, so that the spirit and scope of the present disclosure is not limited by some forms of the present disclosure. The scope of the present disclosure should be construed on the basis of the accompanying claims, and all the technical ideas within the scope equivalent to the claims should be included in the scope of the present disclosure As described above, according to the present technology, the background transfer may be executed to update vehicle software while minimizing the influence on a communication network load, thereby reducing time to perform OTA update for the vehicle, ensuring the consecutive background transfer, and preventing vehicle starting performance from being degraded due to the background transfer.

Besides, a variety of effects directly or indirectly understood through the disclosure may be provided.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An apparatus for an over the air (OTA) update for a vehicle, the apparatus comprising:
   a communication device configured to receive data for the OTA update of vehicle software from a server;
   a processor; and
   a non-transitory storage medium containing program instructions that, when executed by the processor, causes the apparatus to:
      control background transfer for the OTA update based on at least one of a network load, a vehicle power state, a battery state, or an expected time for residual read-only memory (ROM) data transfer;
      determine whether the background transfer is possible in a present battery state for the expected time for the residual background transfer,
      perform the background transfer when the background transfer is possible in the present battery state for the expected time for residual read-only memory (ROM) data transfer,
      set a transmission rate based on the network load,
      control the background transfer based on the set transmission rate and a vehicle state, and
      receive data from a management controller to perform the OTA update.

2. The apparatus of claim 1, wherein the processor is configured to:
   perform the OTA update in a memory dualization scheme and a differential scheme.

3. The apparatus of claim 1, wherein the processor is configured to:
   determine whether a vehicle mode for the OTA update is a download mode or an update mode; and
   determine whether the vehicle is in a driving state when the vehicle mode is the download mode.

4. The apparatus of claim 3, wherein the processor is configured to:
   determine whether the vehicle network load is greater than a threshold value when the vehicle is in an Ignition Off (IG OFF) state.

5. The apparatus of claim 3, wherein the processor is configured to:
   determine the expected time for the residual ROM data transfer; and
   determine whether the present battery state allows the background transfer for the expected time for the residual ROM data when the vehicle is in the IG ON.

6. The apparatus of claim 5, wherein the processor is configured to:
   determine the network load when the background transfer is possible.

7. The apparatus of claim 4, wherein the processor is configured to:
   set a time interval between consecutive frames to be longer and set a unit transfer block size to be smaller when the network load of the vehicle is greater than the threshold value.

8. The apparatus of claim 4, wherein the processor is configured to:
   set the time interval between the consecutive frames to be shorter and set the unit transfer block size to be greater, when the network load of the vehicle is equal to or less than the threshold value.

9. The apparatus of claim 7, wherein the processor is configured to:
   perform the background transfer based on the vehicle network load; and
   determine whether the vehicle is travelling when the background transfer is completed.

10. The apparatus of claim 9, wherein the processor is configured to:
    complete the background transfer when the vehicle state is an IG OFF state; and
    receive approval from a user for the OTA update to perform the OTA update when the vehicle state transits to the IG OFF from an ignition on (IG ON).

11. The apparatus of claim 10, wherein the apparatus further comprises:
    a display configured to display a screen for receiving the approval from the user.

12. The apparatus of claim 10, wherein the apparatus further comprises:
    an alarm device configured to notify the user of a request for the approval for the OTA update.

13. The apparatus of claim 1, wherein the processor is configured to:
    continuously perform the background transfer even when the vehicle power state transits.

14. An apparatus for an over the air (OTA) update for a vehicle, the apparatus comprises:
    a processor executing program instructions stored on a non-transitory storage medium to cause the apparatus to:
       download data for the OTA update from a server;
       control background transfer for the OTA update based on at least one of a network load, a vehicle power state, a battery state, or an expected time for residual read-only memory (ROM) data transfer,
       set a transmission rate based on the network load for the OTA update;
       control background transfer based on the set transmission rate and a vehicle state;

receive the data from a management controller to perform the OTA update;
determine whether the background transfer is possible in a present battery state for the expected time for the residual background transfer; and
perform the background transfer when the background transfer is possible in the present battery state for the expected time for residual read-only memory (ROM) data transfer.

15. A method for an over the air (OTA) update for a vehicle, the method comprising:
    determining at least one of a network load, a vehicle power state, a battery state, or an expected time for residual read-only memory (ROM) data transfer; and
    controlling background transfer for the OTA update based on the at least one of the network load, the vehicle power state, the battery state, or the expected time for the residual ROM data transfer,
    wherein the controlling background transfer for the OTA update further includes:
        determining whether the background transfer is possible in a present battery state for the expected time for the residual background transfer,
        performing the background transfer when the background transfer is possible in the present battery state for the expected time for residual read-only memory (ROM) data transfer,
        setting a transmission rate based on the network load,
        controlling the background transfer based on the set transmission rate and a vehicle state, and
        receiving data from a management controller to perform the OTA update.

16. The method of claim 15, wherein determining the at least one of the network load, the vehicle power state, the battery state, or the expected time for the residual ROM data transfer further comprises:
    determining whether a vehicle mode for the OTA update is a download mode or an update mode;
    determining whether the vehicle is in a driving state when the vehicle mode is the download mode; and
    determining the network load when the vehicle is in an Ignition Off (IG OFF) state.

17. The method of claim 15, wherein controlling the background transfer for the OTA update further comprises:
    setting a time interval between consecutive frames to be longer and setting a unit transfer block size to be smaller when the network load of the vehicle is greater than a threshold value; and
    setting the time interval between the consecutive frames to be shorter and setting the unit transfer block size to be greater when the network load of the vehicle is equal to or less than the threshold value.

18. The method of claim 17, wherein controlling the background transfer for the OTA update further comprises:
    performing the background transfer based on the vehicle network load;
    determining a vehicle state when the background transfer is completed;
    completing the background transfer when the vehicle state is an IG OFF state; and
    receiving approval from a user for the OTA update to perform the OTA update when the vehicle state transits to the IG OFF from an ignition on (IG ON).

19. The method of claim 17, wherein controlling the background transfer for the OTA update further comprises:
    determining the expected time for the residual ROM data transfer;
    determining whether the present battery state allows the background transfer for the expected time for the residual ROM data when the vehicle is in an IG ON; and
    determining the network load when the background transfer is possible.

* * * * *